United States Patent Office 3,451,979
Patented June 24, 1969

3,451,979
CHAIN TERMINATED COPOLYMERS OF STYRENE AND MALEIC ANHYDRIDE OF LOW MOLECULAR WEIGHT
Irving E. Muskat, Miami, Fla., assignor to Sinclair Research, Inc., New York, N.Y., a corporation of Delaware
No Drawing. Continuation-in-part of application Ser. No. 144,562, Oct. 12, 1961. This application June 27, 1966, Ser. No. 560,896
Int. Cl. C08f 21/02, 1/80
U.S. Cl. 260—78.5     4 Claims

ABSTRACT OF THE DISCLOSURE

Copolymers of styrene and maleic anhydride prepared from approximately equimolar amounts of the two monomers. The copolymers have a molecular weight of about 400 to 750 and are chain terminated with certain aralkyl radicals such as cumenyl and P-cymenyl radicals. Said copolymers are useful in surface coating compositions.

This application is a continuation-in-part of application Ser. No. 144,562 filed Oct. 12, 1961, now abandoned.

The present invention is concerned with novel copolymers, particularly copolymers of styrene and maleic anhydride.

Copolymers of styrene and maleic anhydride have long been known and are of considerable utility. Ready reference to the literature such as, for example, U.S. Patent Nos. Reissue 23,514; 2,430,313; 2,606,891; 2,640,819; and 2,675,370 indicates the copolymers which have been prepared, the properties thereof, and their uses. In all the prior art, the copolymers which have been prepared have been of very high molecular weight. Still further, the prior art products all have acetone solution viscosities in excess of about 10.0 centistokes (10 grams of product dissolved in acetone to 100 milliliters with the viscosity measured at 30° C. by the standard technique in an Oswald viscosimeter). Thus, the known copolymers are of limited utility and suffer from certain inherent disadvantages. By way of example, their alkaline salts yield solutions of high viscosity which are difficult to handle and not readily employable in many operations such as coatings and the like.

More recently, novel copolymers of styrene and maleic anhydride have been obtained which generally have acetone solution viscosities of up to 1 centistoke. These copolymers have obviated to a considerable extent the deficiencies of the previously known copolymers and exhibit unusual and more diverse utility. The present invention is concerned with particular copolymers among these more recently discovered copolymers which have even more radically different properties, as well as more effective and additional utility over the general class.

Accordingly, an object of this invention is the provision of novel copolymers. Another object is the provision of novel styrene-maleic anhydride copolymers of unusual physical and chemical characteristics. A specific object is the provision of a copolymer product of styrene and maleic anhydride having unusually low viscosity and molecular weight. Other objects will be evident as the discussion proceeds.

The novel compositions of this invention comprise copolymers of styrene and maleic anhydride in substantially equimolar proportions having a melting point range between about 75 to 100° C. and a molecular weight between about 400 to 750. The novel products also will have an acetone solution viscosity, as hereinafter defined, between about 0.50 to 0.55 centistoke, with an approximate acid number of between about 400 to 500, determined as set forth hereinafter.

The copolymer products of the invention have the following repeating structure

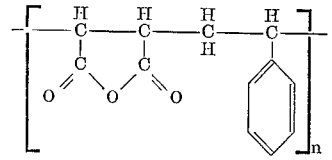

wherein $n$ is a small whole number from 2 to 3 inclusive, including mixtures thereof, and are chain-terminated with a monocyclic hydrocarbon radical having a nucleus of 6 carbon atoms, preferably phenyl substituted with at least one alkyl group containing at least 2 carbon atoms, preferably lower alkyl, and in which the alpha-carbon atom of the alkyl group contains at least one hydrogen substituent. The chain-terminating radicals can be derived from catalyst decomposition products or from the solvents used in the polymerization. Illustrative of preferred chain-terminating agents are cumene and p-cymene. Thus the copolymers will contain the above-depicted unit repeating so as to define a dimer or a trimer.

The novel compositions can be prepared in a number of ways. A particularly effective method for producing the novel products of this invention comprises forming a solution in cumene of equal mols of styrene and maleic anhydride with between about 2 to 5 percent by weight of dicumyl peroxide, based upon the total monomer content, at a temperature at which no exothermic reaction will take place, and feeding this solution to a solvent, preferably the same as that employed in making the feed solution, which has been pre-heated and maintained at a temperature between about 175° to 250° C. and higher. The product is formed esentially instantaneously and can be recovered by the usual techniques of filtration, fractional distillation, crystallization, and the like, depending upon the solvent which is employed. The solvents employed are the chain-terminating alkyl-substituted monocyclic hydrocarbons discussed above. Thus the choice of the solvent may determine the particular chain-terminating radicals incorporated in the product. Further details of preferred methods for producing the novel products are presented in my copending applications Ser. No. 849,706, now Patent 3,085,994, and Ser. No. 849,704, now Patent No. 3,178,395, the pertinent disclosures of which are incorporated herein by the foregoing reference, which applications point out that suitable liquid hydrocarbon terminating agents include the aforementioned alkyl-substituted monocyclic hydrocarbons.

The novel products of this invention are more adequately illustrated by the following examples.

Example I

Into a 3-gallon mixing vessel was added, with agitation, 4468 milliliters of cumene and 777 grams of maleic anhydride, maintaining the temperature at about 60° C. While maintained at this temperature, the solution was filtered to remove small amounts of maleic acid impurity and then returned to the 3-gallon mixing vessel. Then 828 grams of styrene and 76 grams of dicumylperoxide were mixed into the solution with the resulting temperature being about 50° C. Into a separate 5-gallon stainless steel pressure autoclave equipped with internal agitation, a means for externally heating the reactor and its contents, and a means for discharging products, was added 4000 milliliters of cumene. The contents of the autoclave were heated to 250° C., this temperature maintained throughout the run at autogenous pressure (approximately 110 p.s.i.g.). Then the pre-mixed solution maintained at the temperature of about 50° C. was fed under pressure at a uniform rate to the 5-gallon autoclave over a period of about one hour. The reaction was essentially instantaneous. At the completion of the feeding of the solution, the reaction mixture was then subjected to a vacuum in order to strip off the cumene solvent, the temperature dropping to about 150° C. Then the molten polymer was removed by gravity and cooled to room temperature. The friable solid mass obtained was ball milled to a free-flowing powder. An essentially quantitative yield was obtained. Analysis of a sample of the product showed that it had a melting point range of 75 to 85° C., and an acid number of 430 (milligrams of KOH required to titrate 1 gram of the sample). By the boiling point elevation procedure in acetone solvent, it was found that the molecular weight of the product was 610. Ten grams of the product were dissolved to 100 milliliters in acetone and the viscosity measured by the standard procedure using an Oswald viscosimeter. The viscosity obtained was 0.533 centistoke.

The above run was repeated using one-half the amount of catalyst and substituting 2,5-dimethyl-2,5-di-(t-butylperoxy) hexane for dicumyl peroxide to obtain a similar product when operating at 200° C. In another run similar results were obtained substituting p-cymene for cumene. A series of runs were made similar to the above example and the average properties of the copolymer products obtained were: a melting point range between about 75 to 100° C., a molecular weight range between about 600 to 750, an acetone solution viscosity range between 0.50 to 0.55, including both the dimeric and the trimeric structures.

A product produced essentially as described in Example 1 was tested for solubility characteristics by placing a 1-gram sample thereof in 10 milliliters of particular solvents for 24 hours at 26° C. It was found that the product was insoluble in carbon tetrachloride, ethylene glycol, butyl ether, and petroleum ether; soluble in acetone, ethyl acetate, methanol, and dilute alkaline water; and soluble in quantities less than 1 gram per 10 milliliters of the solvent in benzene and triethylene glycol.

The novel compositions of the invention are of considerable and unique utility. They are particularly useful as chemical intermediates. For example, when the product of Example 1 is reacted with an alcohol or ether alcohol such as 2-butoxy ethanol, under the usual conditions of esterification the corresponding partial or diesters are obtained, depending upon the conditions and molar proportions employed. Another particular use of the products is their reaction with polyols, especially a glycol such as polypropylene glycol having a molecular weight of 710, in equimolar quantities at a temperature of about 150° C. for about 2 to 3 hours. In this manner, rather than obtain a rubbery cross-linked product, a heavy liquid polyester-type material is produced. When the resultant material is converted to its alkali metal salt, for example, by hydrolyzing with the theoretical amount of dilute solution of sodium hydroxide, a soluble product is formed which is useful as a water-soluble plasticizer for water-soluble films such as the polyvinyl alcohols. Likewise, the novel products of the invention can be hydrolyzed employing ammoniacal solutions to result in homogeneous aqueous solutions having very low viscosities even at high solids concentration which are useful in various coating applications. The products are also useful as curing agents for epoxy resins, more particularly for epoxy coating resins. Still further uses of the products will be evident.

Having thus described the products of the invention, it is not intended to be limited except as hereinafter set forth.

It is claimed:

1. A copolymer of styrene and maleic anhydride in substantially equimolar proportions, chain-terminated with a radical of a monocyclic hydrocarbon of 6 carbon atoms substituted with at least one alkyl group of at least 2 carbon atoms and in which the alpha-carbon atom of the alkyl group contains at least one hydrogen substituent, said copolymer melting unsharply at a temperature between about 75–100° C. and having an average molecular weight determined by elevation of the boiling point of acetone between about 400 to 750, said copolymer being further characterized in that 10 grams thereof dissolved to 100 milliliters in acetone has a viscosity of between about 0.50 to 0.55 centistoke, measured at 30° C. and having an acid number of between about 400 and 500 determined by the number of milligrams of potassium hydroxide required to titrate one gram thereof.

2. The copolymer of claim 1 wherein the chain-terminating radical is lower alkyl-substituted phenyl wherein the alpha carbon atom of the lower alkyl group contains at least one hydrogen substituent.

3. The copolymer of claim 1 wherein the chain-terminating radical is cumenyl.

4. The copolymer of claim 1 wherein the chain-terminating radical is p-cymenyl.

References Cited

UNITED STATES PATENTS 2,606,891   8/1952   Rowland _____ 260—78.5

OTHER REFERENCES

C. A., Vol. 52, Higashimura et al., p. 60B (January-February 1958).

C. A., Vol. 43, Gregg et al., p. 5731 H (July-September 1949).

JOSEPH L. SCHOFER, *Primary Examiner.*

J. KIGHT III, *Assistant Examiner.*

U.S. Cl. X.R.

260—33.6